United States Patent
Bok et al.

(10) Patent No.: US 11,556,538 B2
(45) Date of Patent: Jan. 17, 2023

(54) QUERY PLAN MIGRATION IN DATABASE SYSTEMS

(71) Applicant: SAP SE, Walldorf (DE)

(72) Inventors: Youngbin Bok, Seoul (KR); Jaehyok Chong, Seoul (KR); Won Jun Chang, Seoul (KR); Sungguk Lim, Seoul (KR)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 16/874,822

(22) Filed: May 15, 2020

(65) Prior Publication Data

US 2021/0357407 A1    Nov. 18, 2021

(51) Int. Cl.
*G06F 7/00* (2006.01)
*G06F 16/2453* (2019.01)
*G06F 16/21* (2019.01)
*G06F 11/34* (2006.01)
*G06F 16/242* (2019.01)

(52) U.S. Cl.
CPC .... *G06F 16/24542* (2019.01); *G06F 11/3409* (2013.01); *G06F 16/217* (2019.01); *G06F 16/2433* (2019.01)

(58) Field of Classification Search
CPC ............. G06F 16/217; G06F 16/24542; G06F 16/2433; G06F 11/3409
USPC ........................................ 707/718, 722, 723
See application file for complete search history.

(56) References Cited

U.S. PATENT DOCUMENTS

| | | | |
|---|---|---|---|
| 10,324,929 B2 | 6/2019 | Qi et al. | |
| 2013/0304723 A1* | 11/2013 | Konik | G06F 16/24561 707/718 |
| 2018/0336246 A1* | 11/2018 | Dasam | G06F 16/2453 |

OTHER PUBLICATIONS

U.S. Appl. No. 16/835,566, Chang et al., Customizable Filtering for Query Plan Stability in Database Systems Using Abstract Query Plans, filed Mar. 31, 2020, 32 of pages.

* cited by examiner

*Primary Examiner* — Md I Uddin
(74) *Attorney, Agent, or Firm* — Fish & Richardson P.C.

(57) ABSTRACT

Methods, systems, and computer-readable storage media for receiving, by a current database system, a query plan file representative of a captured query plan from a source database system, receiving, by the current database system, a set of definitions including one or more definitions, each definition in the set of definitions corresponding to an object that is implicated by the query plan, the object being included in a set of objects, and determining, by the current database system, that each definition in the set of definitions is identical to a respective definition of a corresponding object within the current database system, and in response: executing the captured query plan in the current database system to provide a query result.

14 Claims, 4 Drawing Sheets

FIG. 4

QUERY PLAN MIGRATION IN DATABASE SYSTEMS

BACKGROUND

Enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Processing of queries in database systems generally includes a query processor that parses a received query statement (e.g., SQL statement) to create a query plan (also referred to as a query execution plan (QEP)). The query plan is executed by an execution engine to provide a query result. In some examples, before execution, an optimizer optimizes the query plan to enhance performance of the query plan when executed. Performance can be described in terms of time (i.e., time required to execute the query plan) and burden on technical resources (i.e., processing power and/or memory expended to execute the query plan).

There is a drive to optimize overall performance of database systems. Optimization can improve execution time of transactions, as well as reduce the load on technical resources (e.g., processors, memory) during execution of transactions. In some instances, performance of a database system can regress and analysis is performed in an effort to determine a source of the regression. To this end, a test database system can be used in an effort to recreate one or more transactions of a production database system (e.g., a production database system that is experiencing the regression). A resolution determined using the test database system, however, needs to be accurately implemented within the production database system to resolve the regression.

SUMMARY

Implementations of the present disclosure are directed to query plan migration in database systems. More particularly, implementations of the present disclosure are directed to importing and exporting query plans between a source database system and a target database system.

In some implementations, actions include receiving, by a current database system, a first query plan file representative of a first captured query plan from a source database system, receiving, by the current database system, a first set of definitions including one or more definitions, each definition in the first set of definitions corresponding to an object that is implicated by the first query plan, the object being included in a first set of objects, and determining, by the current database system, that each definition in the first set of definitions is identical to a respective definition of a corresponding object within the current database system, and in response: executing the first captured query plan in the current database system to provide a first query result. Other implementations of this aspect include corresponding systems, apparatus, and computer programs, configured to perform the actions of the methods, encoded on computer storage devices.

These and other implementations can each optionally include one or more of the following features: determining, by the current database system, that each definition in the first set of definitions is identical to a respective definition of a corresponding object within the current database system is executed in response to determining that each object in the first set of objects has a corresponding object in the current database system; determining that each object in the first set of objects has a corresponding object in the current database system includes comparing at least one metadata value of each object in the first set of objects to respective metadata values of objects in the current database system; the first set of definitions is received in response to confirmation input that indicates that metadata of the current database system is different than metadata of the source database system; actions further include receiving, by the current database system, a second query plan file representative of a second captured query plan from the source database system, the second captured query plan associated with a second set of objects comprising one or more objects, each object in the second set of objects being implicated by the second captured query plan, and for each object in the second set of objects, determining that a sub-set of metadata corresponds to a sub-set of metadata of an object within the current database system, and in response: replacing metadata of each object in the second set of objects with metadata of a corresponding object in the current database system, and executing the second captured query plan in the current database system to provide a second query result; the sub-set of metadata includes an object name and an object type; and determining that a sub-set of metadata corresponds to a sub-set of metadata of an object within the current database system is executed in response to confirmation input that indicates that metadata of the current database system is identical to metadata of the source database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to query plan migration in database systems. More particularly, implementations of the present disclosure are directed to importing and exporting query plans between a source database system and a target database system. Implementations can include actions of receiving, by a current database system, a query plan file representative of a captured query plan from a source database system, receiving, by the current database system, a set of definitions including one or more definitions, each definition in the set of definitions corresponding to an object that is implicated by the query plan, the object being included in a set of objects, and determining, by the current database system, that each definition in the set of definitions is identical to a respective definition of a corresponding object within the current database system, and in response: executing the captured query plan in the current database system to provide a query result.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Figure 1:
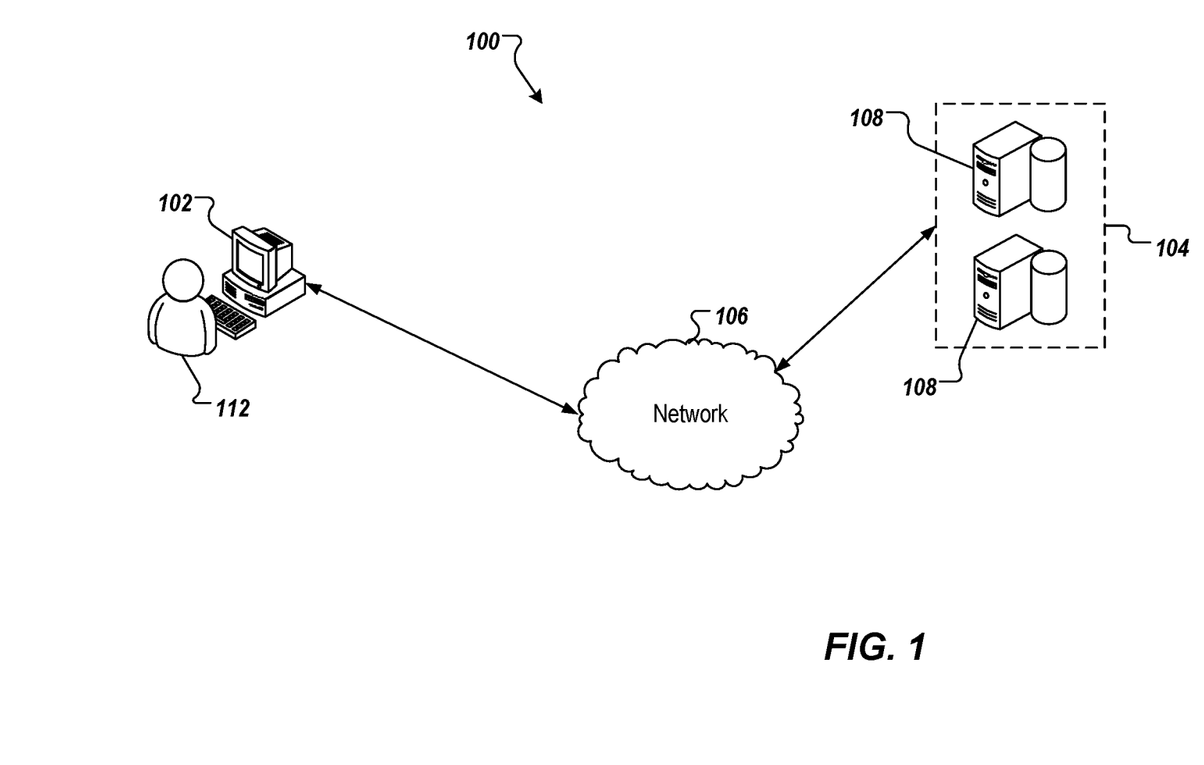
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as noted above, the server system 104 can host an in-memory database system (e.g., SAP HANA). In addition, and as described in further detail herein, the server system 104 can host a source database system, a target database system, and a query plan stability (QPS) system in accordance with implementations of the present disclosure. As described in further detail herein, the QPS system preserves the performance of queries by capturing query plans in the source database system and reusing the query plans in the target database system. In accordance with implementations of the present disclosure, the QPS system includes query plan migration (QPM) functionality for selective import/export of query plans between database systems.

To provide further context for implementations of the present disclosure, and as introduced above, enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Processing of queries in database systems generally includes a query processor that parses a received query statement (e.g., SQL statement) to create a query plan (also referred to as a query execution plan (QEP)). The query plan is executed by an execution engine to provide a query result. In some examples, before execution, an optimizer optimizes the query plan to enhance performance of the query plan when executed. Performance can be described in terms of time (i.e., time required to execute the query plan) and burden on technical resources (i.e., processing power and/or memory expended to execute the query plan).

There is a drive to optimize overall performance of database systems. Optimization can improve execution time of transactions, as well as reduce the load on technical resources (e.g., processors, memory) during execution of transactions. In some instances, performance of a database system can regress and analysis is performed in an effort to determine a source of the regression. To this end, a test database system can be used in an effort to recreate one or more transactions of a production database system (e.g., a production database system that is experiencing the regression). A resolution determined using the test database system, however, needs to be accurately implemented within the production database system to resolve the regression.

More particularly, there are instances where a query plan for a particular query of a first database system (e.g., a test database system) is to be used in a different database system (e.g., a production database system). For example, a bug report can reveal that the performance (e.g., in terms of technical resources and/or time expended) for a query is acceptable in a test database system, while the performance of the same query in a production database system regresses (i.e., the performance in the production database system is worse than in the test database system). Frequently, this results from an issue with the query plan itself, which is executed in response to the query. That is, for example, in the test database system, the query is executed using a first query plan, while, in the production database system the query (same query) is executed using a second query plan that is different from the first query plan. Consequently, it can be desirable to also use the first query plan in the production database system for the query.

This can also occur in a customer support scenario. For example, an enterprise (customer) can have a poor performing query (e.g., in terms of technical resources and/or time expended to execute) within a production database system, and can engage a development team (e.g., customer support team) to analyze the problem. The development team can use a development database system to investigate the problem. However, it is not an insignificant task to re-create the exact query plan in the development system without the production data. However, if the enterprise can capture the query plan in the production system and provide the query plan to the development database system, the development team can perform their investigation on the same query plan.

To this end, implementations of the present disclosure enable a query plan for a query to be captured (recorded) within a source database system (e.g., the test database system) for use in a target database system (e.g., the production database system). Even after capturing the query plan, there are technical obstacles to overcome to use the query plan in the target database system. For example, the target database system could have a different software version than the source database system, in which the query plan was captured. In this case, it can occur that the same query plan cannot be created in the target database system. As another example, because the query plan is attempted to be used in a different database system (e.g., in the target database system), if the related objects are different, the query plan cannot be used (e.g., a required table is not in the target database system, privileges are different within the target database system) the plan cannot be used.

To this end, and as described in further detail herein, implementations of the present disclosure also provide for query plan migration in database systems. More particularly, implementations of the present disclosure are directed to importing and exporting query plans between a source database system and a target database system.

Figure 2:
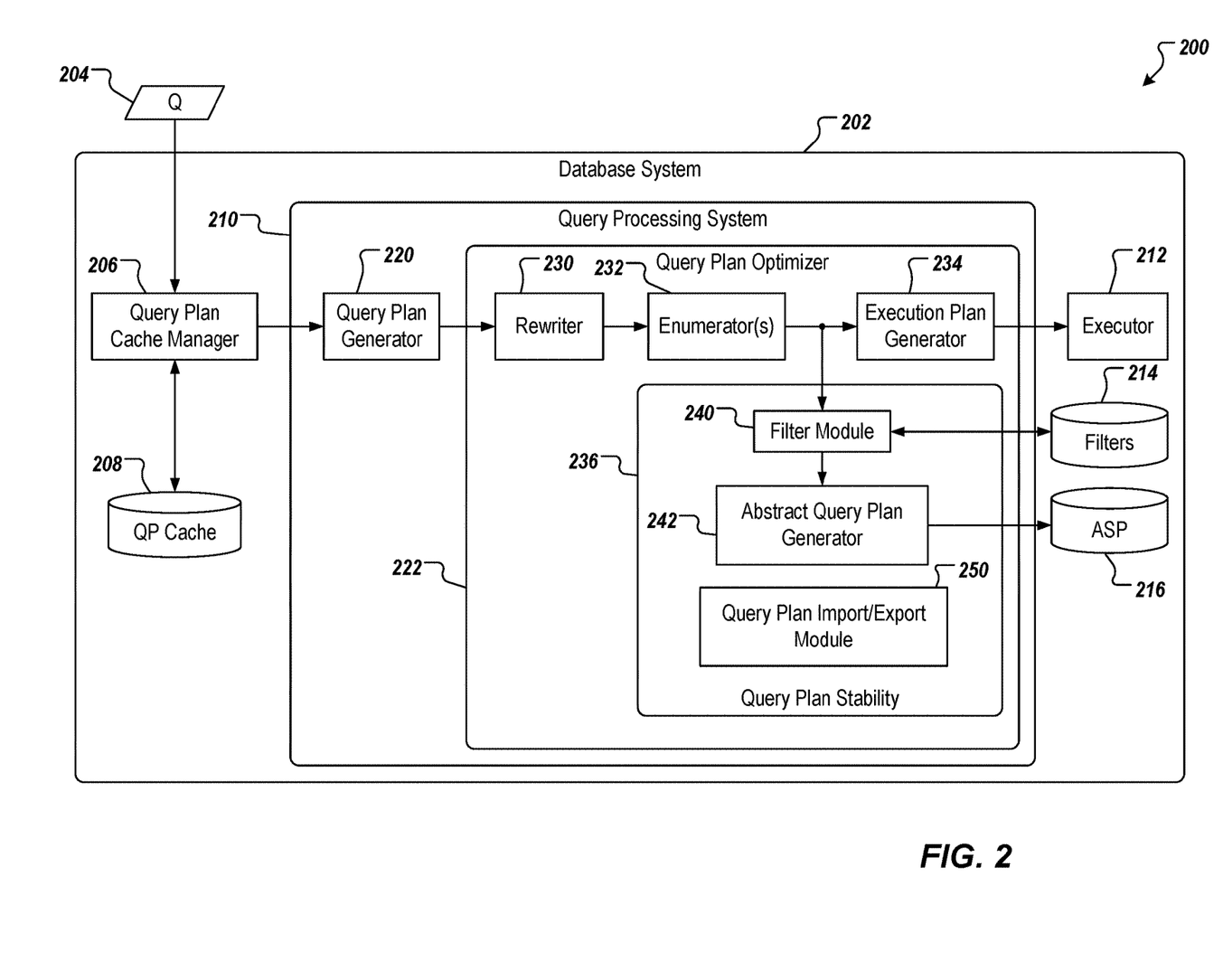
FIG. 2 depicts a conceptual architecture providing query plan migration functionality in a database system.

FIG. 2 depicts a conceptual architecture 200 providing QPS functionality in a database system. In some examples, the database system can be described as a source database system and the QPS functionality includes QPM to export query plans in the source database system to a target database system (not depicted in FIG. 2).

In the example of FIG. 2, the conceptual architecture 200 includes a database system 202 that receives a query 204. In some examples, the query 204 includes metadata that provides a set of query parameters associated with the query. In some examples, the query parameters include one or more of: schema, object, application username, client, application component name, application component type, application name, database username, and user group name. The database system 202 processes the query 204 to provide a query result. For example, a client (e.g., user, application) can submit the query 204 to the database system 202, which processes the query to generate the query result, and the query result is sent to the client. The query 204 is provided as a set of query statements (e.g., SQL statements) that includes one or more query statements.

In further detail, the database system 202 includes a query plan cache manager 206, a query plan cache 208, a query processing system 210, an executor 212, a filters store 214, and an abstract query plan (ASP) store 216. In some examples, the query plan cache manager 206 receives the query 204 and determines whether a query plan had already been generated and cached for the query 204. That is, the query plan cache manager 206 determines whether the query 204 had already been received and processed by the database system 202. If the query 204 had already been received and processed by the database system 202, a query plan for the query 204 is retrieved from the query plan cache 208 for processing to generate the query result. If the query 204 had not already been received and processed by the database system 202, the query 204 is processed by the query processing system 210 to generate a query plan.

In the example of FIG. 2, the query processing system 210 includes a query plan generator 220 and a query plan optimizer 222. The query plan generator 220 processes the query 204 to generate an initial query plan. In some examples, processing of the query 204 includes parsing the query 204 to provide a parsed query, checking the parsed query, and compiling the parsed query to provide the initial query plan. The initial query plan is input to the query plan optimizer 222, which provides a query plan for execution by the database system 202. Accordingly, the query plan is an optimized version of the initial query plan. The query plan is provided to the executor 212 for execution to generate a query result.

In the example of FIG. 2, the query plan optimizer 222 includes a rewriter module 230, an enumerator module 232, an execution plan generator module 234, and a query plan stability module 236. In some examples, the rewriter module 230 receives the initial query plan and rewrites the initial query plan to provide a rewritten query plan. In some examples, rewriting of the initial query plan can include changing an order of operations within the initial query plan to provide the rewritten query plan. The rewritten query plan is provided to the enumerator module 232, which includes one or more enumerators. Example enumerators include a logical enumerator and a cost-based enumerator. The enumerator module 232 process the rewritten query plan to provide an optimized query plan. The optimized query plan is provided to the execution plan generator 234, which provides the query plan (e.g., a query execution plan (QEP)) for execution by the executor 212.

The optimized query plan is provided to the query plan stability module 236. In accordance with implementations of the present disclosure, the query plan stability module 236 receives the optimized query plan and the set of parameters (i.e., provided in the metadata of the query 204), and applies a set of filters to determine whether an abstract query plan is to be generated for the query 204. The query plan stability module 236 includes a filter module 240 and an abstract query plan generator 242.

By way of non-limiting example, an example query can be provided as:

select*from t1 where t1 is a table stored within the database system 202. An example abstract query plan (in Javascript object notation (JSON) format) for the above example query can be provided as:

```
{"alp_rels":[{"alp_Rel":{"alias":"T1","alp_id":0,"enumerated_by":
174,"field_names":[ ],"guide":{"alp_Guide":{"hints":[{"hint":"HEX_
TABLE_SCAN"}],"type":0}},"hash_partition_column":-2147483648,
"input_size":10000,"intermediate_alternative":false,"is_ap_inject
ed":false,"is_esx_node":false,"is_view_cache":false,"join_table_n
ame":"","locked":false,"logically_enumerated":false,"output_colum
n_size":1,"partition_search_ids":[ ],"physical_operator_type":49,"
referenced_cols":[{"col":0}],"rel_id":1000000,"rel_type":6,"remot
e_srv_id":-1,"schema_name":"SYSTEM","table_name":"T1",
"table_type":0,"trex_externalkey_pos":-2147483648,"trex_rel_id":-
1,"trex_rowid_needed":false,"trex_rowid_pos":1000001,"used_cols":
[{"col":0},{"col":1000001}],"volume_id":-1}},{"alp_Rel":
{"alp_id":1,"child_rel_id":0,"enumerated_by":174,"intermediate_al
ternative":false,"is_esx_node":false,"is_hex":true,"locked":false
,"logically_enumerated":false,"output_column_size":0,"physical_op
erator_type":49,"project_col_aliases":[{"alias":"NULL"}],"project
_col_labels":[{"label":"A"}],"project_cols":[{"alp_Exp":{"col_id"
:0,"exp_type":0,"field_name":"A","is_grouping_id":false,"is_table
_key":false,"org_table_name":"T1","position":-1,"prefetch":
false,"promoted_type":{"ftc":0,"length":4294967295,"scale":0},"re
al_result_type":{"ftc":3,"length":10,"scale":0},"rel_id":1000000,
"result_type":{"ftc":3,"length":10,"scale":0},"schema_name":"SYST
EM","table_name":"T1"}}],"rel_type":3,"trex_rel_id":-1,
"volume_id":2}}],"root_rel_id":1}
```

Further detail of the conceptual architecture 200 is provided in commonly assigned U.S. application Ser. No. 16/835,566, filed Mar. 31, 2020, and entitled CUSTOMIZABLE FILTERING FOR QUERY PLAN STABILITY IN DATABASE SYSTEMS USING ABSTRACT QUERY PLANS, the disclosure of which is expressly incorporated herein by reference in the entirety for all purposes.

In accordance with implementations of the present disclosure, the query plan stability module 236 includes a query plan import/export module 250 that provides QPM functionality described herein. For example, and as described herein, a query plan is captured within the database system 202 (as a source database system) and is recorded in a query plan file. In some examples, the query plan is recorded using JSON format. That is, the query plan is recorded in a JSON file. In some examples, the query plan file is serialized (e.g., by the query plan import/export module 250), is exported to a target database system (e.g., transmitted from the database system 202 to another database system). Serialization includes translating data structures of the query plan file into a format that can be transmitted and reconstructed. In some examples, the serialized query plan file is received by a database system (target database system) and is deserialized to provide the query plan file in the database system. The query plan file, which records the query plan, can be used to reproduce the query plan in the database system. In some examples, the target database system also includes a query plan import/export module to perform import functionality, as described herein.

In some examples, the target database system, in which the query plan is to be recreated can have a different software version than the source database system, in which the query plan was recorded. For example, the target database system may have an updated software version (V2) than a software version (V1) of the source database system. To account for this, the query plan import/export module of the target database system analyzes metadata associated with the underlying query to determine whether the query plan is usable.

To illustrate this, the following non-limiting example scenario can be considered:
1. Create: table t1 (a int, b varchar (10))
2. Capture query: [select*from t1]
3. Upgrade system (e.g., V1→V2)
4. Drop: table t1
5. Create: table t1 (d decimal (10, 2))
6. Apply captured plan for [select*from t1]

Example Scenario: Upgrade after Query Plan Capture
In the example scenario, when query plan is first captured in the source database system for the query [select*from t1], the query plan needed to project two columns, namely, "a" and "b". After upgrade of the software used to operate the database system(s), when trying to use the captured query plan, there is no column "a" or column "b" in the database system(s), because the table definition of t1 has changed. That is, the query plan would now need to project one column "d" as a decimal. Consequently, the captured query plan cannot be used in a database system having the updated software (V2).

In view of this, implementations of the present disclosure enable detection of whether one or more objects (e.g., tables) have been changed since capture of the query plan. In further detail, when capturing the query plan in the source system, metadata representative of related objects is also recorded. In some examples, a related object is an object that is impacted (e.g., accessed) for execution of the query plan. Example related objects can include, without limitation, tables and views. Example metadata includes, without limitation, object identifier (object_id) that uniquely identifies an object within a database system, name (object_name), type (object_type), and version (object_version). Example metadata can be provided as:

```
"related_objects":[{"object_id":"154364","object_
    name":"SYSTEM.T1","object_type":1,"object_
    version":"1"}]}
```

When trying to apply the captured query plan, the captured metadata is compared to corresponding metadata of the related object(s) in the current database system (e.g., the database system, in which the captured query plan is to be used, such as the source database system). In some examples, if the metadata is the same, the related object(s), and the captured query plan, can be used. For example, and with reference to the example scenario above, if, for each related object, object_id, object_name, object_type, and object_version are the same between the captured metadata and the corresponding metadata in the current database system, the table t1, and the captured query plan implicating table t1 can be used (assuming metadata of any other related objects is also the same).

If, however, the metadata is different the captured query plan is not used in the current database system (e.g., the target database system). In some examples, the metadata can be different as a result of an object being modified and/or an object being deleted and recreated. For example, and referring again to the examples above, if table t1 is dropped and recreated, the object_id assigned to table t1 changes. If the drop/recreation occurs after the query plan implicating table t1 is captured, the captured metadata will not match the corresponding metadata in the current database system (e.g., the object_id are different). As another example, if a column is added to table t1 (e.g., alter table t1 add (d nvarchar (256)), the object version is incremented. If the column addition occurs after the query plan implicating table t1 is captured, the captured metadata will not match the corresponding metadata in the current database system (e.g., the object_version are different).

Further, in a typical database system upgrade, the objects remain untouched. Consequently, the metadata of an object is the same after the upgrade as before the upgrade, and captured query plans can be applied without any problem. However, when the two database systems are different (e.g., test database system, production database system), the metadata is different. The following non-limiting example can be considered:

```
Test system: create table t1 (a int)
"object_id":"154364","object_name":"SYSTEM.T1","object_type":1,"object_version":"1"
Production_system: create_table t1 (a int)
"object_id":"186999","object_name":"SYSTEM.T1","object_type":1,"object_version":"1"
```

Here, the object_id is different between the test database system and the production database system. This means that, because related objects' metadata information is different (even for the same table, the object_id will be different), even after importing the captured query plan, the captured query plan cannot be used.

To address this, and as described in further detail herein, implementations of the present disclosure provide for replacement of the captured metadata for related objects and capturing of the definitions of related objects to enable captured query plans to be used in different database systems.

With regard to replacement of the captured metadata for related objects, implementations of the present disclosure enable confirmation input to be received, which indicates whether the metadata of related objects is the same between the source database system and the target database system. For example, a user can provide confirmation input to indicate whether the metadata of related objects as between the source database system and the target database system. In some examples, the user has a role and/or a privilege assigned thereto that enables the user to provide the confirmation input. For example, prior to enabling the user to provide the confirmation input, a role and/or a privilege of the user is determined (e.g., from a user profile assigned to the user) to determine whether the user has the role and/or privilege to provide the confirmation input. Example confirmation input can include, without limitation, a 0 to indicate that the metadata is not the same, and a 1 to indicate that the metadata is the same.

For example, and in the example scenario of a production database system and a test database system within an enterprise, enterprises typically use the same object definitions (e.g., table definition, view definition) between the database systems. This enables the enterprise to execute tests in the test database system that are accurate to the production database system. Consequently, a user having intimate knowledge of the test database system and the target database system can provide confirmation input that accurately reflects the metadata consistency across the database systems.

In some implementations, if the confirmation input indicates that the metadata of objects is the same between the database systems, the captured metadata for related objects of the captured query plan is replaced with the corresponding metadata of the related objects within the current database system (i.e., the (target) database system, within which the captured query plan is to be executed). In some implementations, one or more metadata values from the captured metadata are used to search for related objects within the current database system. By way of non-limiting example, object_name and/or object_type can be used of a related object can be used to identify corresponding metadata of a respective object within the current database system. For example, a captured query plan can include the following example captured metadata for a related object:

"related_objects":[{"object_id":"154364","object_name":"SYSTEM .T1","object_type":1,"object_version":"1"}]}

From the captured metadata, object_name of SYSTEM.T1 and object_type of 1 can be used to search the metadata of the current database system to identify a corresponding object within the current database system. Continuing with this example, the following metadata can be returned from the search:

"related_objects":[{"object_id":"194758","object_name":"SYSTEM .T1","object_type":1,"object_version":"3"}]}

In this example, although the values of object_name and object_type are the same other metadata values are different. In accordance with implementations of the present disclosure, the captured metadata of the captured query plan is replaced with the metadata of the corresponding object within the current system. That is, the captured metadata is replaced to be identical to the metadata determine from the current database system. In this manner, the captured query plan can be executed within the current database system without problem.

In accordance with implementations of the present disclosure, and as described herein, before execution plan generation, the captured metadata is compared to metadata returned from the search. If there is a match (e.g., metadata matches if replaced correctly during the plan migration), the query plan is generated and executed. In some examples, this includes the abstract query plan (e.g., JSON plan above) being changed to a plan object of the database optimizer. Because the metadata check has already been finished, the optimizer can trust the captured plan and the information within it.

With regard to capturing of the definitions of related objects, when capturing the query plan in the source database system to provide the captured query plan, a definition of each related object is also captured to provide a set of object definitions including one or more object definitions. For example, and continuing with the non-limiting example above, for the query plan for the query [select*from t1], the definition of table t1 (e.g., CREATE COLUMN TABLE "SYSTEM"."T1" ("A" INTEGER)) is recorded in a set of definitions.

When importing the captured query plan to the current database system, a search is performed for objects within the current database system based on object metadata (e.g., object_name). That is, for each related object, a corresponding object is searched for within the current database system. If an object is not identified in the current database system, an error is flagged and the captured query plan is not used. If an object is identified in the current system, a definition for the object is compared to the corresponding definition in the set of definitions. If the object definitions are the same, the captured query is used in the current database system. If the object definitions are not the same, an error is flagged and the captured query plan is not used.

Figure 3:
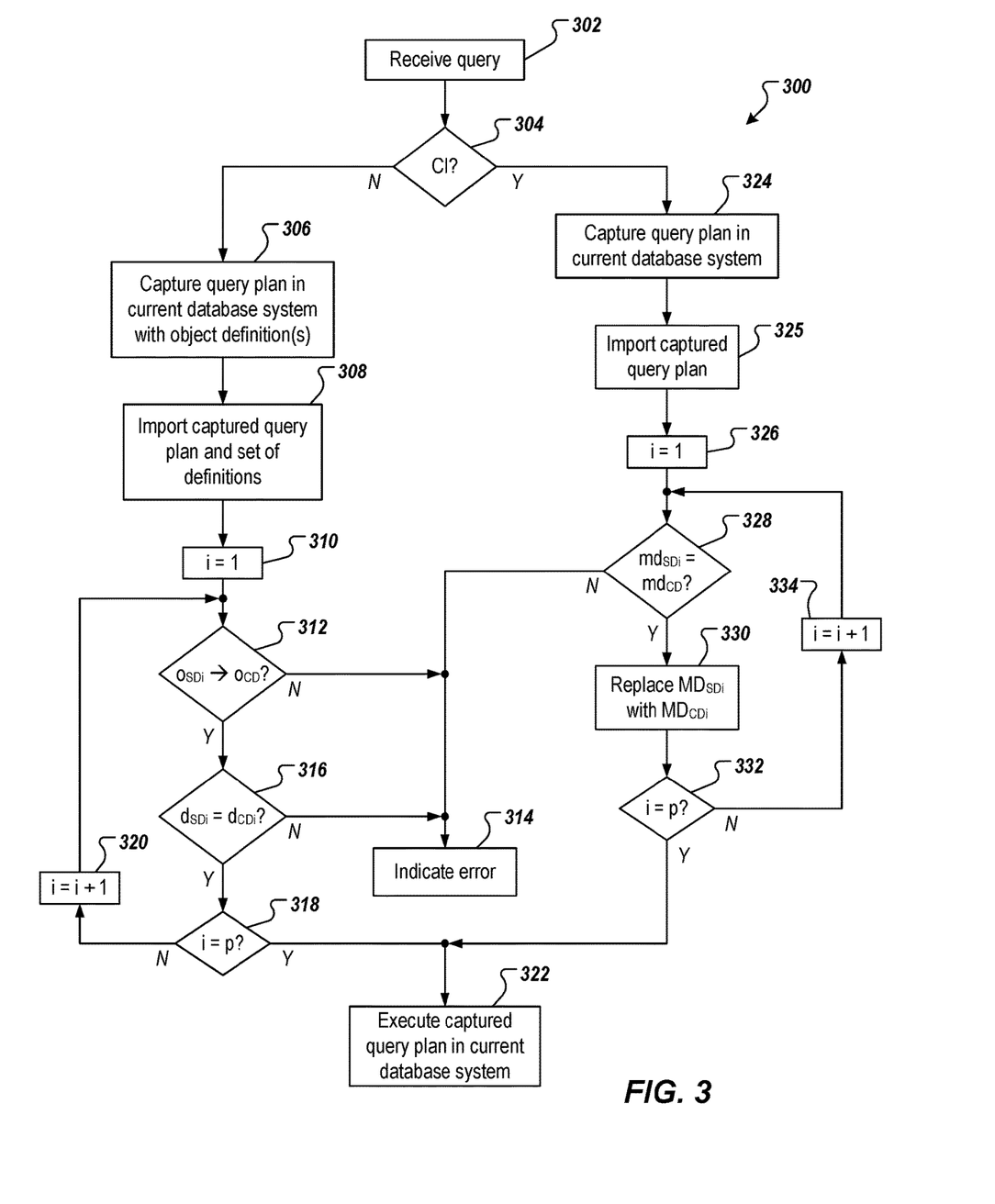
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. For example, query plan import/export modules (e.g., the query plan import/export module 250 of FIG. 2) of respective database systems each perform at least a portion of the example process 300.

A query is received (302). For example, the database system 202 of FIG. 2 receives the query 204. In some examples, the query is a query that is to be captured and executed in another database system. For example, the query 202 is to be captured in the database system 202, as a source database system, and is to be executed in another database system, as a current database system (also referred to herein as target database system). It is determined whether confirmation information indicates that metadata in the source database system is the same as metadata in the target database system (304). For example, and as described herein, confirmation information can be received from a user. In some examples, the confirmation information is received by the database system 202. In some examples, the confirmation information is provided to the target database system. In some examples, if no confirmation information is received, it is assumed that metadata in the source database system is the same as metadata in the target database system.

If the confirmation information does not indicate that metadata in the source database system is the same as metadata in the current database system, a query plan is captured within the current database system and a set of definitions is provided (306). For example, a query plan for the query 204 is generated within the database system, as described herein, and the query plan is captured to provide a captured query plan, as also described herein. For example, the captured query plan can be provided as an ASP. In some examples, for each object impacted by the captured query plan, a set of objects is provided (e.g., O=$o_1, \ldots, o_p$, where p is the number of objects in the set of objects). Using the non-limiting example query [select*from t1], the set of objects includes table t1. In some examples, for each object in the set of objects, a definition is provided in a set of definitions (e.g., D=$d_1, \ldots, d_p$). Continuing with the non-limiting example above, a definition [CREATE COLUMN TABLE "SYSTEM". "T1" ("A" INTEGER)] is included in the set of definitions.

The captured query plan and set of definitions are imported to the target database system (308). For example, and as described herein, the captured query plan is recorded in a query plan file (e.g., JSON format), is serialized, and is transmitted (with the set of definitions) to the target database system.

A counter i is set equal to 1 (310). It is determined whether an object i of the source database system ($o_{SDi}$) has a corresponding object in the current database system ($o_{CDi}$) (312). For example, and as described herein, a value for object_name of the object ($o_{SDi}$) is searched for within the current database system to determine whether an object in the current database system has the same value for object_name. If the object i of the source database system ($o_{SDi}$) does not have a corresponding object in the current database system ($o_{CDi}$), an error is indicated (314) and the captured query plan cannot be executed in the current database system. If a corresponding object is identified in the current system, a definition for the object of the current database system ($o_{SDi}$) is compared to the definition ($d_{SDi}$) in the set of definitions provided from the source database system (316). In some examples, the comparison can be executed by determining an edits distance between the two definitions, and, if the edit distance is less than a threshold value (e.g., 1) the definitions are determined to be the same. An edit distance can be described as a number of operations (e.g., add a character, remove a character, add a space, remove a space) that would need to be performed to at least one of the definitions in order for the definitions to be the identical. If the object definitions are not the same, an error is flagged (314) and the captured query plan is not used.

If the object definitions are the same, it is determined whether the counter i is equal to p (318). That is, it is determined whether all objects in the set of objects have been considered. If the counter i is not equal to p, the counter i is incremented (320) and the example process 300 loops back. If the counter i is not equal to p, the captured query plan is executed in the current database system (322). That is, the captured query plan is executed on objects stored within the current database system to generate a query result.

If the confirmation information does not indicate that metadata in the source database system is the same as metadata in the current database system, a query plan is captured within the target database system (324). For example, a query plan for the query 204 is generated within the database system, as described herein, and the query plan is captured to provide a captured query plan, as also described herein. For example, the captured query plan can be provided as an ASP. In some examples, for each object impacted by the captured query plan, a set of objects is provided (e.g., O=$o_1, \ldots, o_p$, where p is the number of objects in the set of objects). Using the non-limiting example query [select*from t1], the set of objects includes table t1.

A counter i is set equal to 1 (326). It is determined whether a sub-set of metadata of object i of the source database system ($md_{SDi}$) is equal to a sub-set of metadata of an object of the current database system ($md_{CD}$) (328). For example, each object i can be associated with a set of metadata ($MD_i$), from which a sub-set of metadata ($md_i$) can be provided. By way of non-limiting example, a set of metadata can be provided as:

{"object_id":"154364","object_name":"SYSTEM.T1","object_type":1,"object_version":"1"} and a sub-set of metadata can be provided as:

{"object_name":"SYSTEM.T1","object_type":1}

If the sub-set of metadata of object i of the source database system ($md_{SDi}$) is equal to a sub-set of metadata of an object of the current database system ($md_{CD}$), an error is flagged (314) and the captured query plan is not used.

If the sub-set of metadata of object i of the source database system ($md_{SDi}$) is equal to a sub-set of metadata of an object of the current database system ($md_{CD}$), the set of set of metadata of object i of the source database system ($MD_{SDi}$) is replaced with the set of metadata of the object of the current database system ($MD_{CD}$) (330). It is determined whether the counter i is equal to p (332). That is, it is determined whether all objects in the set of objects have been considered. If the counter i is not equal to p, the counter i is incremented (324) and the example process 300 loops back. If the counter i is not equal to p, the captured query plan is executed in the current database system (322). That is, the captured query plan is executed on objects stored within the current database system to generate a query result.

Figure 4:
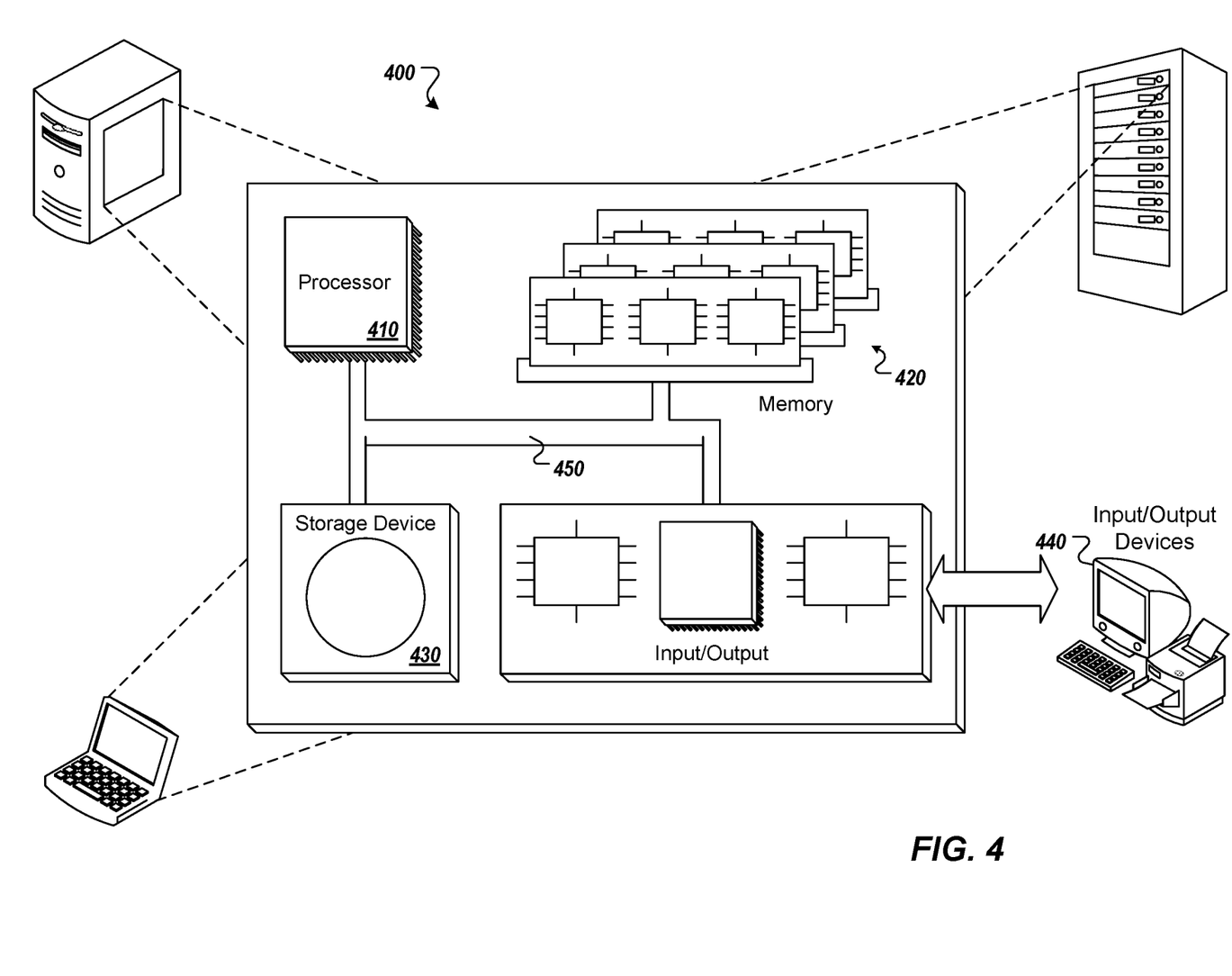
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for query plan migration in database systems, the method being executed by one or more processors and comprising:
  receiving, by a current database system, a first query plan file representative of a first captured query plan, the first captured query plan having been recorded within a source database system, the current database system having a different software version than the source database system;
  receiving, by the current database system, a first set of definitions comprising one or more definitions, each definition in the first set of definitions corresponding to an object that is implicated by the first query plan and comprising a create statement defining a name of the object and features of the object, the object being included in a first set of objects;
  comparing at least one metadata value of each object in the first set of objects to respective metadata values of objects in the current database system; and
  determining, by the current database system, that each definition in the first set of definitions is identical to a respective definition of a corresponding object within the current database system based on the comparison, and in response:

executing the first captured query plan in the current database system to provide a first query result;

receiving, by the current database system, a second query plan file representative of a second captured query plan from the source database system, the second captured query plan associated with a second set of objects comprising one or more objects, each object in the second set of objects being implicated by the second captured query plan; and for each object in the second set of objects, determining that a sub-set of metadata corresponds to a sub-set of metadata of an object within the current database system, and in response:

replacing metadata of each object in the second set of objects with metadata of a corresponding object in the current database system, and executing the second captured query plan in the current database system to provide a second query result.

2. The method of claim 1, wherein determining, by the current database system, that each definition in the first set of definitions is identical to a respective definition of a corresponding object within the current database system is executed in response to determining that each object in the first set of objects has a corresponding object in the current database system.

3. The method of claim 1, wherein the first set of definitions is received in response to confirmation input that indicates that metadata of the current database system is different than metadata of the source database system.

4. The method of claim 1, wherein the sub-set of metadata comprises an object name and an object type.

5. The method of claim 1, wherein determining that a sub-set of metadata corresponds to a sub-set of metadata of an object within the current database system is executed in response to confirmation input that indicates that metadata of the current database system is identical to metadata of the source database system.

6. A non-transitory computer-readable storage medium coupled to one or more processors and having instructions stored thereon which, when executed by the one or more processors, cause the one or more processors to perform operations for query plan migration in database systems, the operations comprising:

receiving, by a current database system, a first query plan file representative of a first captured query plan, the first captured query plan having been recorded within a source database system, the current database system having a different software version than the source database system;

receiving, by the current database system, a first set of definitions comprising one or more definitions, each definition in the first set of definitions corresponding to an object that is implicated by the first query plan and comprising a create statement defining a name of the object and features of the object, the object being included in a first set of objects;

comparing at least one metadata value of each object in the first set of objects to respective metadata values of objects in the current database system; and determining, by the current database system, that each definition in the first set of definitions is identical to a respective definition of a corresponding object within the current database system based on the comparison, and in response:

executing the first captured query plan in the current database system to provide a first query result;

receiving, by the current database system, a second query plan file representative of a second captured query plan from the source database system, the second captured query plan associated with a second set of objects comprising one or more objects, each object in the second set of objects being implicated by the second captured query plan; and for each object in the second set of objects, determining that a sub-set of metadata corresponds to a sub-set of metadata of an object within the current database system, and in response:

replacing metadata of each object in the second set of objects with metadata of a corresponding object in the current database system, and executing the second captured query plan in the current database system to provide a second query result.

7. The computer-readable storage medium of claim 6, wherein determining, by the current database system, that each definition in the first set of definitions is identical to a respective definition of a corresponding object within the current database system is executed in response to determining that each object in the first set of objects has a corresponding object in the current database system.

8. The computer-readable storage medium of claim 6, wherein the first set of definitions is received in response to confirmation input that indicates that metadata of the current database system is different than metadata of the source database system.

9. The computer-readable storage medium of claim 6, wherein the sub-set of metadata comprises an object name and an object type.

10. The computer-readable storage medium of claim 6, wherein determining that a sub-set of metadata corresponds to a sub-set of metadata of an object within the current database system is executed in response to confirmation input that indicates that metadata of the current database system is identical to metadata of the source database system.

11. A system, comprising:

a computing device; and a non-transitory computer-readable storage device coupled to the computing device and having instructions stored thereon which, when executed by the computing device, cause the computing device to perform operations for query plan migration in database systems, the operations comprising:

receiving, by a current database system, a first query plan file representative of a first captured query plan, the first captured query plan having been recorded within a source database system, the current database system having a different software version than the source database system;

receiving, by the current database system, a first set of definitions comprising one or more definitions, each definition in the first set of definitions corresponding to an object that is implicated by the first query plan and comprising a create statement defining a name of the object and features of the object, the object being included in a first set of objects;

comparing at least one metadata value of each object in the first set of objects to respective metadata values of objects in the current database system; and determining, by the current database system, that each definition in the first set of definitions is identical to a respective definition of a corresponding object within the current database system based on the comparison, and in response:

executing the first captured query plan in the current database system to provide a first query result;

receiving, by the current database system, a second query plan file representative of a second captured query plan from the source database system, the second captured query plan associated with a second set of objects comprising one or more objects, each object in the second set of objects being implicated by the second captured query plan; and for each object in the second set of objects, determining that a sub-set of metadata corresponds to a sub-set of metadata of an object within the current database system, and in response:

replacing metadata of each object in the second set of objects with metadata of a corresponding object in the current database system, and executing the second captured query plan in the current database system to provide a second query result.

12. The system of claim 11, wherein determining, by the current database system, that each definition in the first set of definitions is identical to a respective definition of a corresponding object within the current database system is executed in response to determining that each object in the first set of objects has a corresponding object in the current database system.

13. The system of claim 11, wherein the first set of definitions is received in response to confirmation input that indicates that metadata of the current database system is different than metadata of the source database system.

14. The system of claim 11, wherein the sub-set of metadata comprises an object name and an object type.

* * * * *